United States Patent [19]

Hansen

[11] Patent Number: 4,865,276
[45] Date of Patent: Sep. 12, 1989

[54] RETAINER FOR AN AIRPLANE RUDDER

[76] Inventor: Wayne Hansen, Box 165, Walton, N.Y. 13856

[21] Appl. No.: 261,496

[22] Filed: Oct. 24, 1988

[51] Int. Cl.⁴ ............................................. B64C 13/14
[52] U.S. Cl. .................................................... 244/224
[58] Field of Search ................ 244/224, 1 R, 87, 200, 244/198; 114/172; 24/489, 499, 500, 505, 513, 517, 519

[56] References Cited

U.S. PATENT DOCUMENTS

| | | | |
|---|---|---|---|
| D. 218,143 | 7/1970 | Kinder et al. ...................... | 244/224 |
| 626,370 | 6/1899 | Doyle, Jr. ............................ | 114/172 |
| 3,288,401 | 11/1966 | Fete ...................................... | 244/224 |
| 3,971,532 | 7/1976 | Fountain ............................. | 244/224 |
| 4,418,881 | 12/1983 | Bouldin ............................... | 244/224 |

Primary Examiner—Joseph F. Peters, Jr.
Assistant Examiner—Rodney Corl

[57] ABSTRACT

A retainer for an aircraft rudder for holding stable such rudder during storage but which retainer will automatically remove itself from the airplane should the airplane be taxied from its storage position without the retainer first being removed from the rudder.

10 Claims, 2 Drawing Sheets

RETAINER FOR AN AIRPLANE RUDDER

BACKGROUND OF THE INVENTION

This invention relates to a device for retaining the rudder of a stored aircraft in place to prevent destruction of the rudder from flapping in the wind when the airplane is stored in an open area, and more particularly to such a device which will fail safe should the aircraft be taken into flight without first removing the retainer from the rudder.

Retainers for the rudder of an aircraft are known in the art, and it is a common practice for aircraft operators to clamp the rudder of the airplane when stored in an open area, so as to prevent the destruction of the rudder from flapping in the breeze. Unfortunately, aircraft operators have also been known inadvertently to attempt to fly the plane with the rudder of the aircraft still clamped in place, resulting in a severely hazardous situation, since the aircraft is virtually uncontrollable without the use of the rudder.

By use of this invention, should an attempt be made to fly the aircraft without first removing the retainer from the rudder, the retainer will automatically be released from the rudder of the aircraft upon the initial movement of the aircraft.

SUMMARY OF THE INVENTION

The broad purpose of the present invention is to provide a retainer for the rudder of an aircraft which will automatically be released from the aircraft should the aircraft be moved or taxied from storage.

A pair of elongated members are provided to clamp the rudder in place. At one end, the elongated members are pivotably connected to one another. At the opposite end, a tongue is pivotably connected to one of the pair of elongated members, and a latch means is mounted on the opposite elongated member, which latch means engages the tongue means to hold the two elongated members on the aircraft. A cable means, affixed at one end to the ground is connected at the opposite end to the latch means to open the latch means and pull the rudder stabilizer from the aircraft in the event the aircraft is moved without first removing the retainer from the rudder of the aircraft.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the views, and in which.

DESCRIPTION OF THE PREFERRED EMBODIMENT

Figure 1:
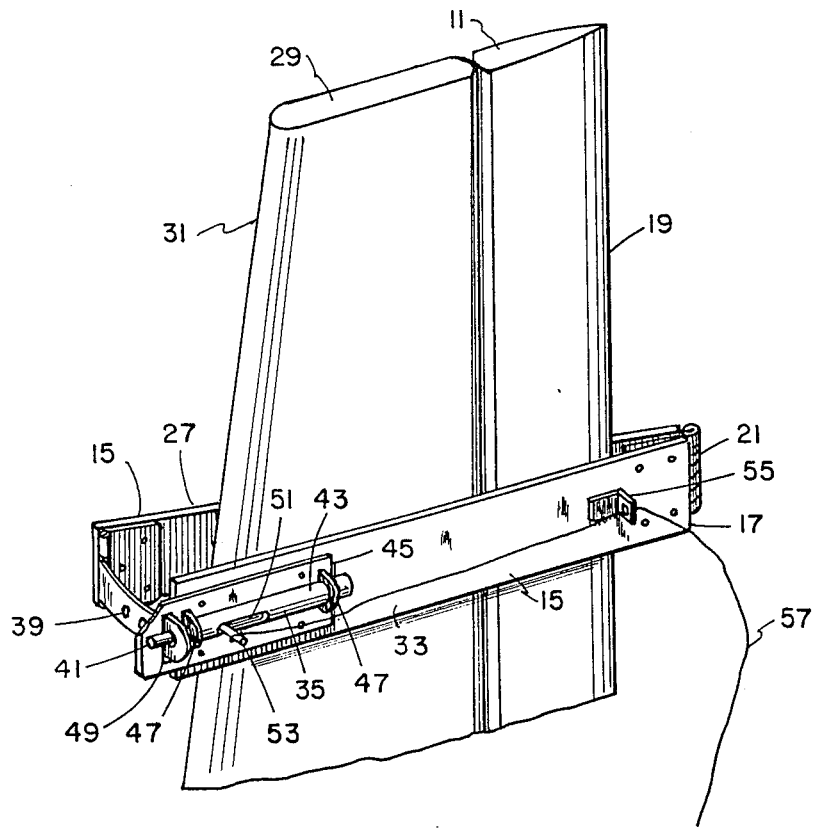
FIG. 1 is a perspective view of the retainer for the rudder of an aircraft mounted on the rudder with the latch means holding the retainer in place in the rudder.

Referring to FIG. 1 of the drawings, the retainer for the rudder of an aircraft 13 is shown mounted on the rudder 11 of aircraft 13. Two elongated members 15 are clamped against opposite sides of the rudder 11 of the aircraft 15. In this way, the rudder 11 of the aircraft 13 is held rigidly in place and cannot flap in the wind when the aircraft 13 is stored in an open area.

Figure 2:
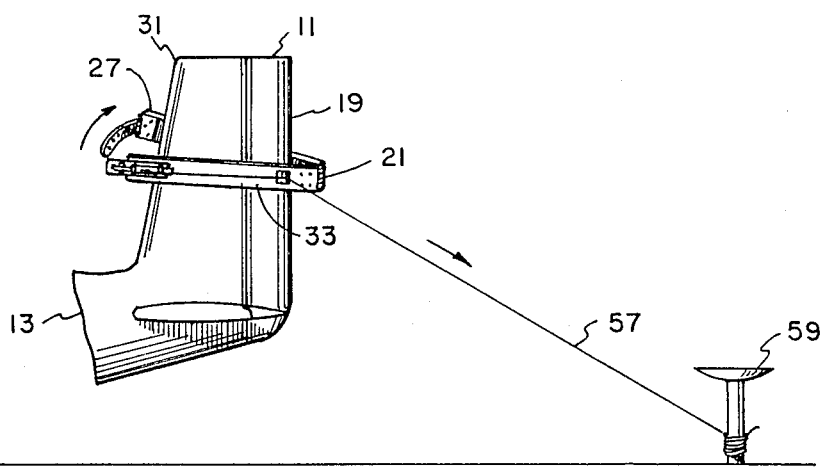
FIG. 2 is a side elevation of the rudder of an aircraft with the retainer mounted on the rudder and with the latch pulled open, showing the retainer being removed from the rudder of the aircraft.
Figure 3:
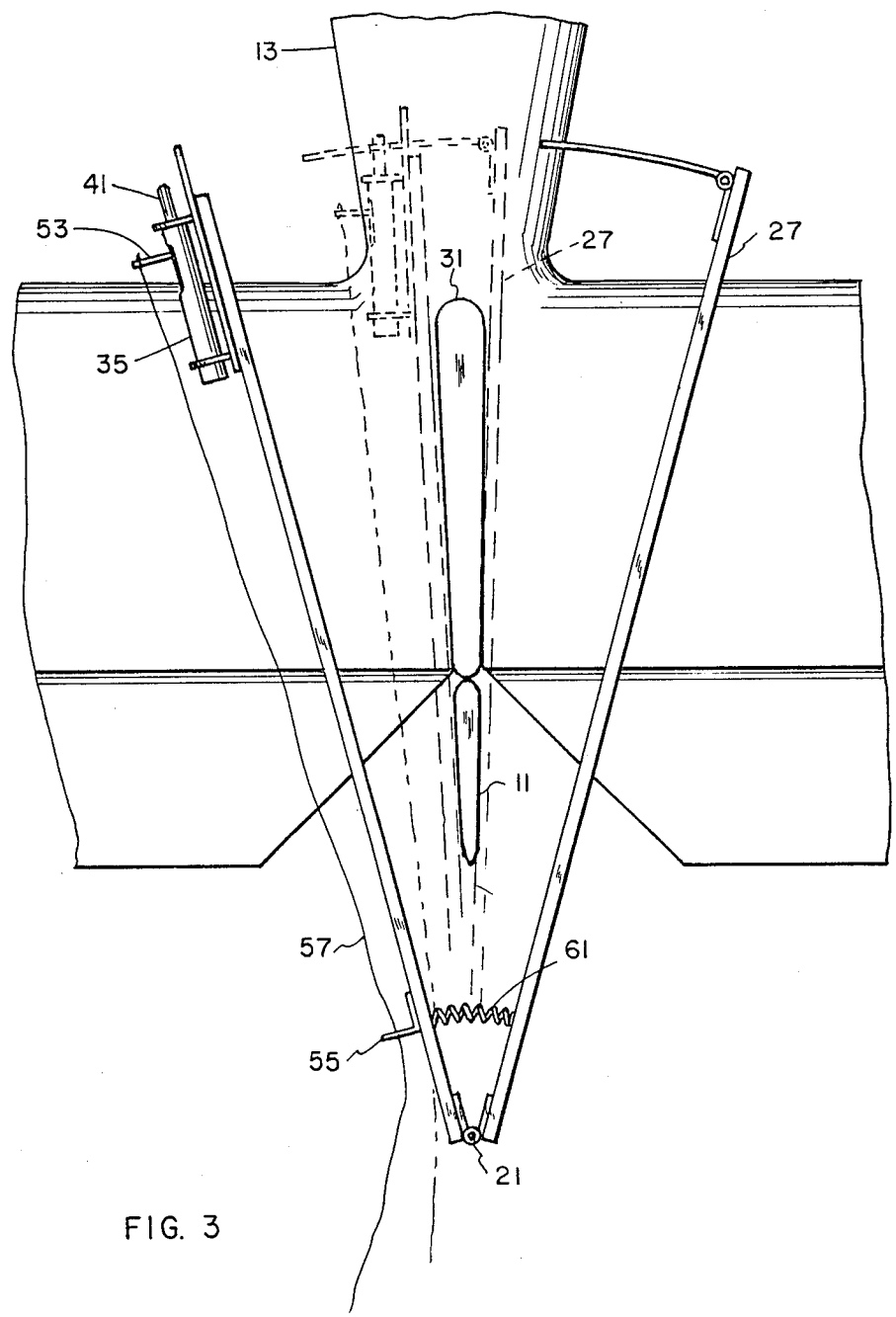
FIG. 3 is a top plan view of the rudder of an aircraft showing the retainer being opened and showing the compression spring used to force open the retainer and showing the retainer opening, but with the retainer also shown in italics in its closed position.

The two elongated members 15, each have ends 17 which are located at the most rearward end 19 of the rudder 11. The two elongated members 15 are pivotably connected to one another at the ends 17 by a hinge 21. The two elongated members 15 have substantially the same length and cross section. At the opposite ends 23 of the two elongated members 15, one elongated member 25 of the two elongated members 15 has a tongue 27 pivotably mounted on it. In the embodiment shown in FIGS. 1 and 2, the tongue is mounted on the right hand side 29 of the rudder as one faces the tail end of the aircraft. However, the tongue can be mounted on either of the two elongated members 15. The tongue 27 extends across the forward edge 31 of the rudder 11 of the aircraft 13 to the other elongated member 33 on which a latch means 35 is located. The latch means 35 on the other elongated member 33 engages the tongue 27 on the elongated member 25, thereby holding the two elongated members 15 clamped against the rudder 11. Preferably, the tongue is curved so as to extend outwardly from the forward edge 31 of the rudder 11, and includes a series of holes 39 through it along its longitudinal length to permit the latch means 35 to engage the tongue 27 at a suitable point to assure that the two elongated members 15 are firmly secured against the rudder 11 of the aircraft 13. In this way, the retainer may be used on various aircraft 13 with rudders 11 of varying size.

The latch means 35 includes a rod 41 slidably mounted in a cylinder 43. The cylinder 43 is secured to a mounting plate 45 by means of a pair of lugs 47. The rod 41 slides back and forth in the cylinder 43. The mounting plate 45 extends beyond the elongated member 33 and is rigidly affixed to the elongated member 33 on which the latch means 35 is located. The mounting plate 45 has a vertical slot 49 through it in the portion of the mounting plate 45 extending beyond the elongated member 33. The vertical slot 50 serves to receive the tongue 27. The vertical slot 49 has the same general shape as the cross-section of the tongue 27, but is slightly larger so that the tongue 27 can readily engage the vertical slot 49. Once the tongue 27 passes through the vertical opening 49, the rod 41 is moved forward to engage a hole 39, thereby locking both elongated members 15 against the rudder 11.

A horizontal opening 51 extends along the cylinder 43 and a handle 53, which is rigidly affixed to the rod 41 at substantially a right angle to the rod 41, extends outwardly through the horizontal opening 51 in the cylinder 43. The handle, when moved back and forth in the horizontal opening 51 moves the rod in and out of the hole 39, thereby either securing the tongue 27 in place or releasing the tongue 27.

Aligned with the latch means 35 and affixed to the same elongated member 33 on which the latch means 35 is located, but adjacent to the hinge 21, is a cable guide 55. A cable 57 is threaded through the cable guide 55 and is connected at one end to the handle 53 on the rod of the latch means 35. The other end of the cable 57 is affixed to the ground, preferably by a stake 59, or is affixed in some manner to any fixed mounting.

Preferably, between the two elongated members 15, adjacent to the hinge 21 there is located a compression spring 61, which forces the two elongated members 15 apart if the latch means 15 is released from the tongue 27 by pulling the handle 53 back, and thereby withdrawing the rod from whatever hole 39 in the tongue 27 the rod 41 has been placed to hold the retainer in place.

It can be readily seen that should an aircraft operator attempt to move the aircraft 13, without having removed the retainer, the cable 57 will withdraw the rod 41 from the latch means 35 and pull the retainer from the aircraft 13, thereby avoiding the extreme hazard of trying to fly an aircraft with the rudder 11 held in a fixed position.

While a preferred embodiment has been shown and described, various modifications and substitutions may be made without departing from the spirit and scope of this invention. Accordingly, it is understood that this invention has been described by way of illustration, rather than limitation.

Having described my invention, I claim:

1. A retainer for holding secure the rudder of an airplane during storage in an open area, said retainer comprising:
   a pair of elongated members having substantially the same length and being pivotably connected to one another at one end;
   a tongue pivotably mounted on one of the elongated members at the end of the elongated member opposite from the end where the two elongated members are pivotably connected to one another, the tongue extending from the elongated member on which the tongue is mounted toward the other elongated member;
   a latch means mounted on the elongated member opposite from the elongated member on which the tongue is pivotably mounted, said latch means being mounted at the end of the elongated member opposite from the end where the two elongated members are pivotably connected to one another, said latch means including a means to engage the tongue which can be withdrawn from the tongue to release the tongue; and
   means for withdrawing the means to engage the tongue from the tongue when the aircraft is moved from the place of storage.

2. A retainer for holding secure the rudder of an airplane during storage in an open area, said retainer comprising:
   a pair of elongated members having substantially the same length and being pivotably connected to one another at one end;
   a tongue pivotably mounted on one of the elongated members at the end of the elongated member opposite from the end where the two elongated members are pivotably connected to one another, the tongue extending from the elongated member on which the tongue is mounted toward the other elongated member;
   a latch means mounted on the elongated member opposite from the elongated member on which the tongue is pivotably mounted, said latch means being mounted at the end of the elongated member opposite from the end where the two elongated members are pivotably connected to one another, said latch means including a rod means to engage the tongue which can be withdrawn from the tongue to release the tongue; and
   a cable means for withdrawing the rod means from the tongue when the aircraft is moved from the place of storage.

3. A retainer according to claim 2 wherein the latch means includes a cylinder and the rod means is slidably mounted within the cylinder, the cylinder having a horizontal opening through it, a handle being affixed to the rod means and the handle extending through the horizontal opening, the cable means being connected to the handle.

4. A retainer according to claim 2 wherein the cable means is affixed at one end to the latch means and affixed at the other end so as to release the latch means when the airplane moves.

5. A retainer according to claim 1 wherein the tongue is curved.

6. A retainer according to claim 2 wherein the tongue is curved.

7. A retainer according to claim 1 including a means to force the two elongated members to pivot away from one another.

8. A retainer according to claim 2 wherein the latch means includes:
   a cylinder having a horizontal opening through it, the rod means being slidably mounted in the cylinder;
   a mounting plate which extends beyond the end of the elongated members on which it is mounted and through which there is a vertical slot to receive the tongue;
   means for securing the cylinder to the mounting plate; and
   a handle rigidly connected to the rod means and extending through the horizontal opening.

9. A retainer according to claim 1 wherein the latch means includes:
   a mounting plate which extends beyond the end of the elongated member on which it is mounted and through which there is a vertical slot to receive the tongue;
   a cylinder having a horizontal opening through it, a rod means being slidably mounted in the cylinder;
   means for securing the cylinder to the mounting plate; and
   a handle rigidly connected to the rod means and extending through the horizontal opening and a cable means being connected at one end to the handle.

10. A retainer for holding secure the rudder of an airplane during storage in an open area, said retainer comprising:
    a pair of elongated members each having substantially the same length and cross section;
    a hinge connected to one end of each of the pair of elongated members;
    a tongue pivotably mounted on one of the elongated members at the end of the elongated member opposite from the end where the two elongated members are connected to one another by a hinge, the tongue extending from the elongated member in which the tongue is mounted toward the other elongated member, the tongue having a series of holes through it along its longitudinal length;
    a latch means mounted on the elongated member opposite from the elongated member on which the tongue is mounted, said latch means being mounted at the end of the elongated member opposite from the end where the two elongated members are connected by a hinge, said latch means including:

a mounting plate which extends beyond the end of the elongated member on which it is mounted, and through which there is a vertical slot to receive the tongue, a cylinder having a horizontal opening through it, means for securing the cylinder to the mounting plate, a rod slidably mounted in the cylinder, and a handle rigidly connected to the rod and extending through the horizontal opening; and a cable connected to the handle at one end to open the latch when the aircraft is moved.

* * * * *